United States Patent

[11] 3,557,712

[72] Inventor Veljko Milenkovic
     Boulder, Colo.
[21] Appl. No. 727,601
[22] Filed May 8, 1968
[45] Patented Jan. 26, 1971
[73] Assignee General American Transportation
     Corporation
     Chicago, Ill.
     a corporation of New York

[54] RAILWAY TRAINS FOR COMBINATION RAILWAY AND PASSENGER AUTOMOBILE TRANSPORTATION, AND CARS THEREFOR
23 Claims, 7 Drawing Figs.

[52] U.S. Cl. .................................................. 105/368,
                                                   105/4, 105/340
[51] Int. Cl. ................................................. B61d 3/02,
                                                   B65j 1/22
[50] Field of Search ..................................105/340, 368B,
                                                   368, 3, 4

[56] References Cited
UNITED STATES PATENTS
2,211,469  8/1940  King ........................... 105/340

| 2,881,713 | 4/1959 | Brill et al. ............ | 105/4 |
| 3,285,194 | 11/1966 | Clejan .................. | 105/368X |
| 3,290,058 | 12/1966 | Ellerd ................... | 105/368X |

FOREIGN PATENTS

| 869,512 | 5/1961 | Great Britain ......... | 105/368 |
| 911,690 | 11/1962 | Great Britain ......... | 105/368 |
| 1,274,220 | 9/1961 | France .................. | 105/368 |

Primary Examiner—Drayton E. Hoffman
Attorney—Prangley, Clayton, Mullin & Vogel

ABSTRACT: There is disclosed a railway train for use in the railway transportation of both passenger automobiles and the passengers thereof comprising a front car and at least one automobile carrier and a rear car; the automobile carrier has a frame supported well above the tracks and carrying therebeneath a floor for supporting automobiles arranged laterally thereof, a lounge space being provided above the automobile storage space with stairways interconnecting the automobile storage space and the lounge space; the front car and the rear car also are provided with an automobile storage space in the lower portions thereof and a passenger lounge space in the upper portions thereof.

RAILWAY TRAINS FOR COMBINATION RAILWAY AND PASSENGER AUTOMOBILE TRANSPORTATION, AND CARS THEREFOR

The present invention is directed to a railway train for the railway transportation of both passenger automobiles and the passengers thereof, and to railway cars useful in making up such a railway train.

It is an important object of the present invention to provide a railway car useful as an automobile carrier and comprising an elongated frame supported adjacent to the opposite ends thereof upon running gears and positioned well above the associated railway track, a first plurality of longitudinally spaced-apart depending hanger posts arranged along one side of the frame and extending downwardly therefrom, a second plurality of longitudinally spaced-apart depending hanger posts arranged along the other side of the frame and depending downwardly therefrom, a substantially horizontal floor carried by the lower ends of the posts and spaced a short distance above the associated railway track and having the ends thereof longitudinally confined between the running gears, a plurality of coordinate laterally aligned pairs of confronting doorways provided on the opposite sides of the floor, whereby a passenger automobile may be driven onto and off of the floor through either one of the two laterally aligned confronting doorways and whereby an automobile on the floor extends laterally thereof, a plurality of doors respectively associated with the doorways and mounted upon the frame and selectively movable between open and closed positions with respect to the doorways, and a roof and sidewalls carried by the frame and cooperating with the floor and the doors to form an elongated enclosure about the frame.

In connection with the foregoing object, another object of the invention is to provide a railway car of the type set forth wherein the running gears are standard gauge for cooperation with standard gauge railway tracks.

Another object of the invention is to provide a railway car of the type set forth wherein the frame includes two longitudinally extending truss structures interconnected at spaced-apart points therealong to maintain the truss structures in general parallelism, the first hanger posts depending from one of the truss structures and the second hanger post depending from the other truss structure.

Another object of the invention is to provide a railway car of the type set forth wherein passenger walkways are disposed between adjacent pairs of automobiles on the floor, whereby the doors of the automobiles adjacent to the passenger walkways may be opened to permit access to and egress from the automobiles.

Another object of the invention is to provide a railway car of the type set forth wherein there is mounted on the frame an upper floor overlying the lower floor, the upper floor cooperating with the roof to provide a passenger lounge space, stairways providing communication between the automobile storage space and the passenger lounge space.

In connection with the foregoing object, another object of the invention is to provide in a railway car of the type set forth a lounge space wherein there is provided restroom facilities and chairs.

A further object of the invention is to provide a railway train for the railway transportation of both passenger automobiles and the passengers thereof, the railway train comprising a front car and at least one automobile carrier of the type set forth and a rear car all connected in tandem relation, supporting trucks interconnecting adjacent cars in the train.

A still further object of the invention is to provide a railway train of the type set forth wherein the front car and the rear car each may have passenger automobile storage space in the lower portion thereof and passenger lounge space in the upper portion thereof.

Still further features of the invention pertain to the particular arrangement of the parts of the railway train and the cars thereof forming a part of the present invention, whereby the above outlined and additional operating features thereof are attained.

The invention, both as to its organization and method of operation, together with further objects and advantages thereof, will best be understood by reference to the following specification taken in connection with the accompanying drawings, in which:

Figure 1:
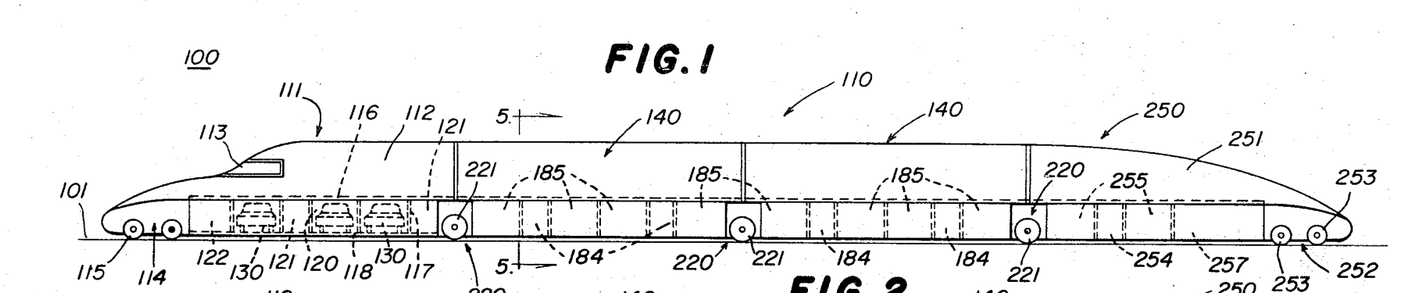
FIG. 1 is a side elevational view of a railway train made in accordance with and embodying the principles of the present invention.
Figure 2:
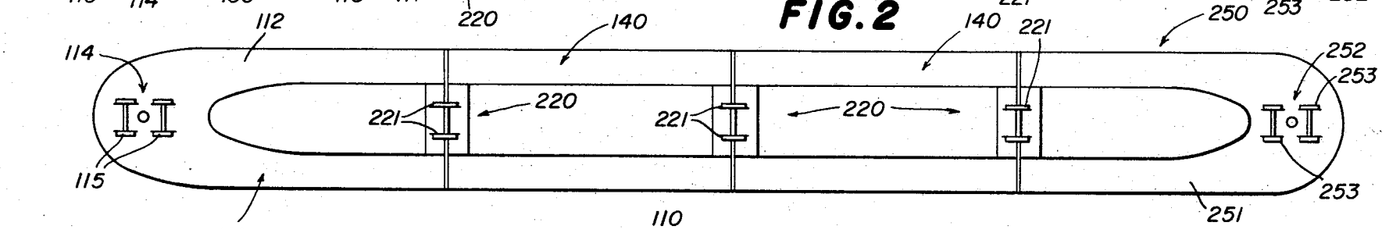
FIG. 2 is a bottom view of the train of FIG. 1.

Referring to FIGS. 1 and 2 of the drawings, there is illustrated a combination railway and passenger automobile transportation system 100 which incorporates therein a railway train and railway cars made in accordance with and embodying the principles of the present invention. More specifically, there is provided a railway train 110 that is adapted to run upon a railway track 101 of standard gauge, the railway track 101 being formed by a pair of standard rails 102 and 103, see FIG. 5. It will be understood that in most cases there will be provided a double railway track 101, whereby railway trains may pass one another going in opposite directions or in the same direction thereon. As illustrated, the train 100 includes a front car 111, two automobile carriers 140 and a rear car 250 all connected in tandem relation.

The details of construction of the front car 111 of the railway train 110 will now be described with special reference to FIGS. 1 and 2 of the drawings. The front car 111 includes a body 112 that is somewhat pointed and rounded at the forward or left-hand end thereof as viewed in the drawings so as to impart thereto an aerodynamic shape which facilitates fast operation thereof, the train of the present invention being designed to travel at speeds of the order of 200 m.p.h. A portion of the body 112 is provided with a wrap around window 113 so that an engineer may view the track 101 ahead during the operation of the train 110. The front end of the front car 111 is mounted upon a truck 114 which may be of standard construction and is supported by two sets of rail wheels 115, and the rear end of the front car 111 is pivotally connected to a two-wheel truck 220, the details of which will be described more fully hereinafter.

As illustrated, the front car 111 further includes a main frame 116 supported well above the railway track 101 and mounted at the forward end on the truck 114 and on the rear end of the truck 220. Depending downwardly from the frame 116 is a plurality of hanger posts 117 which support at the lower ends thereof a floor 118 disposed only a short distance above the railway track 101. The space between the main frame 116 and the floor 118 provides an automobile storage space which is divided into compartments 120 for receiving automobiles 130 therein, passenger walkways 121 being provided between adjacent pairs of the automobiles 130 to permit access to and egress from the automobiles 130 while in the storage space 120, it being noted that the automobiles 130 are disposed transversely of the longitudinal axis of the train 110 on the track 101. There also is provided in the front car 111 a motor area 122 which is adapted to receive and contain suitable equipment for providing motive power to the front car 114 and in fact in certain cases for the entire train 110. Finally, there is provided above the automobile storage space 120 a passenger lounge space or crew lounge space and passages connecting the passenger walkways 121 to the adjacent automobile carrier 140.

Figure 5:
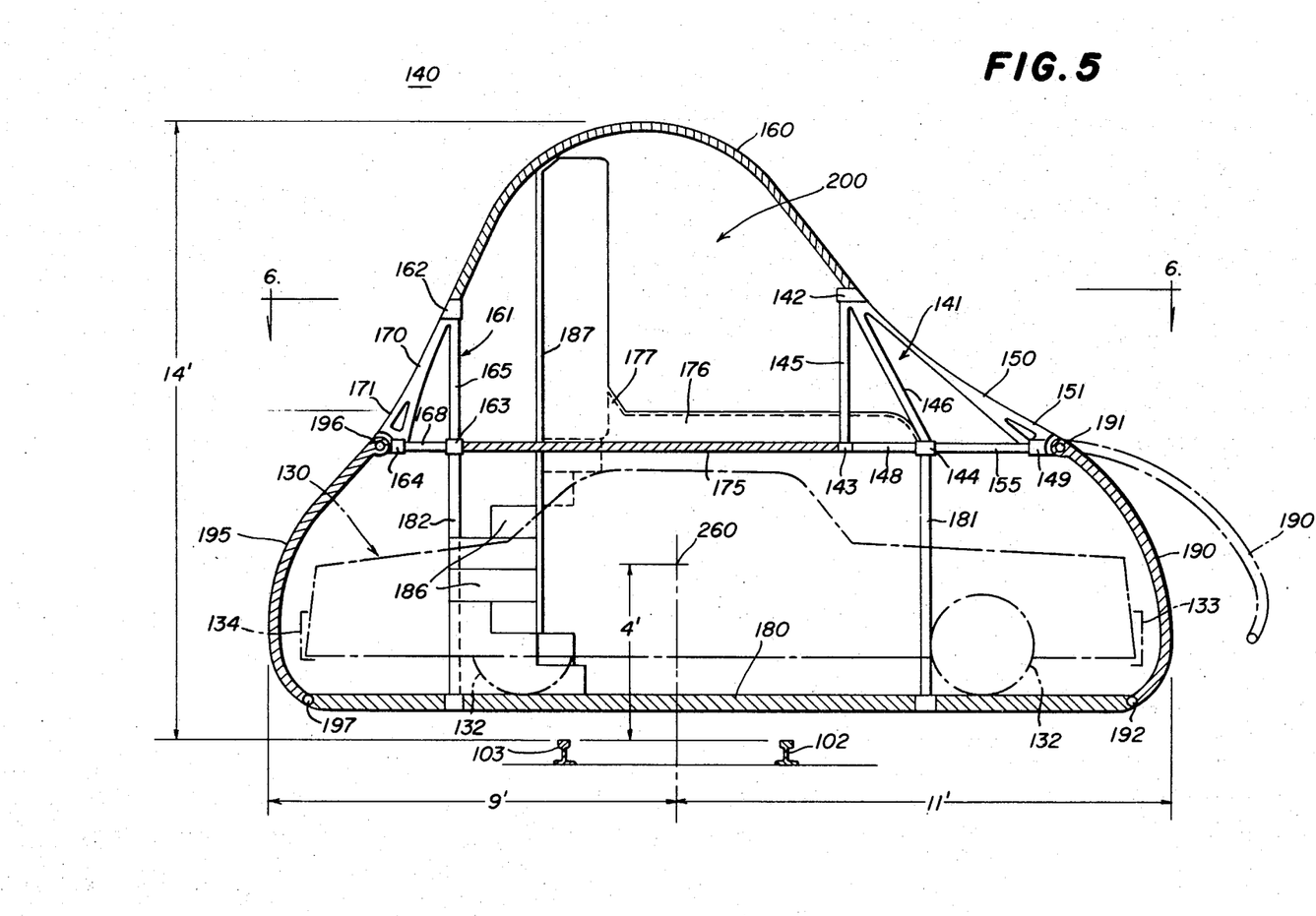
FIG. 5 is an enlarged view in vertical section through the automobile carrier forming a part of the train of FIG. 1 as seen along the line 5–5 thereof.
Figure 6:
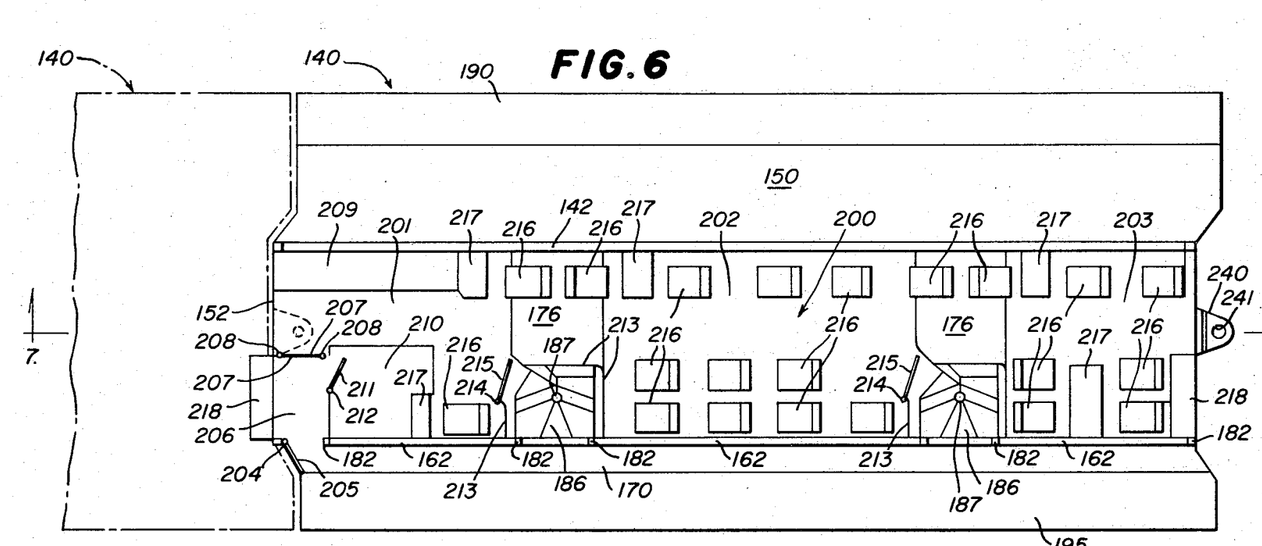
FIG. 6 is a horizontal sectional view on a reduced scale through the car of FIG. 5 as seen along the line 6–6 thereof.
Figure 7:
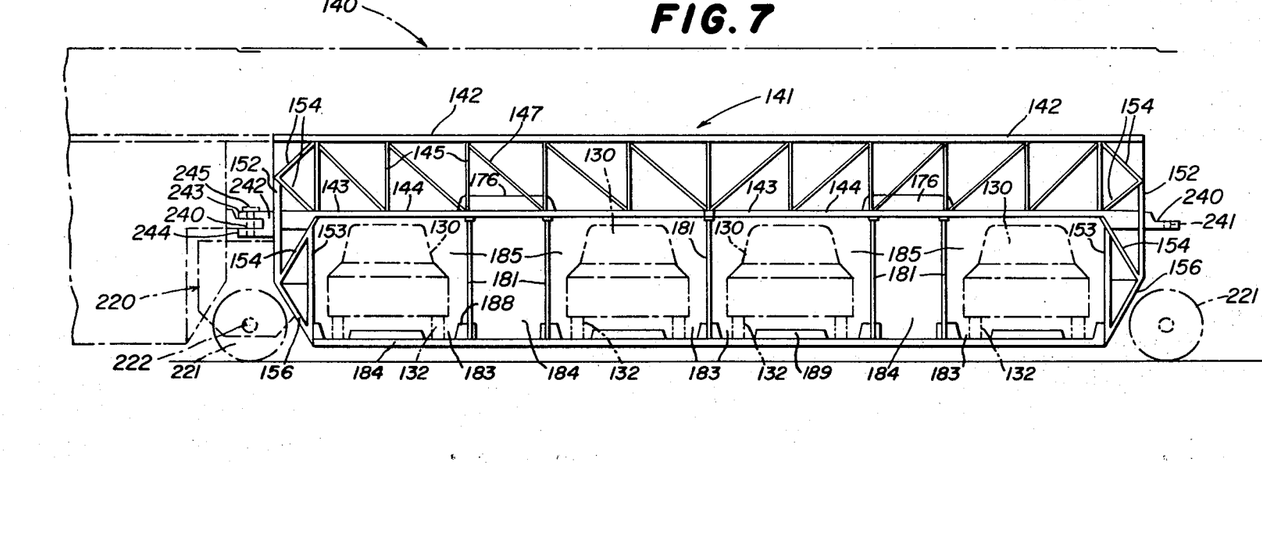
FIG. 7 is a view in vertical section through the car of FIG. 6 along the line 7–7 thereof.

The automobile carrier or vehicle 140 is best illustrated in FIGS. 5 to 7, the carrier 140 including a frame formed of a first longitudinally extending truss 141 and a second longitudinally extending truss 161, the trusses 141 and 161 being laterally spaced-apart and extending the length of the carrier 140 and supporting all other parts of the carrier 140 thereon. The first truss 141 includes a longitudinally extending upper beam 142, a longitudinally extending inner lower beam 143 and an intermediate lower beam 144. The upper beam 142 and the lower beam 143 are connected by a series of vertically arranged inner members 145, while the upper beam 142 and the lower beam 144 are connected by a series of vertically arranged outer members 146, there also being provided braces between the upper end of one of the members 145 and the lower end of the adjacent member 145, such as the inner brace 147 (see FIG. 7), it being understood that like inner braces are provided between the upper end of one of the outer members 146 and the lower end of the adjacent outer member 146. Further, the lower beams 143 and 144 are connected by laterally extending bottom members 148, whereby a triangular cross section of this portion of the first truss 141 is provided comprising the beams 142, 143 and 144, all interconnected by the members 145, 146, and 148, thereby to give a particularly strong and rigid and lightweight construction for the first truss 141.

There further is provided, and forming a part of the first truss 141, an outer lower beam 149 which is connected to the upper beam 142 by a series of outer braces 150, the lower end of the outer braces 150 being enlarged and hollow as at 151 so as to provide increased strength at this point for a purpose to be described more fully hereinafter. The intermediate lower beam 144 and the outer beam 149 are interconnected by bottom members 155, whereby the beams 142, 144 and 149 are also held in a triangular configuration by means of the braces 150 and the members 146 and 155.

The second truss 161 includes a longitudinally extending upper beam 162, a longitudinally extending inner lower beam 163 and an outer lower beam 164. The upper beam 162 and the lower beam 163 are connected by a series of vertically arranged members 165, while the upper beam 162 and the lower beam 164 are connected by a series of outer braces 170, there also being provided braces between the upper end of one of the members 165 and lower end of the adjacent member 165. Further, the lower beams 163 and 164 are connected by laterally extending bottom members 168, whereby a triangular cross section of this portion of the second truss 161 is provided comprising the beams 162, 163 and 164, all interconnected by the members 165 and 168 and the outer brace 170. It also is pointed out that the lower ends of the outer braces 170 are enlarged and hollow as at 171 so as to increase the strength thereof for a purpose to be explained more fully hereinafter.

Referring to FIGS. 6 and 7, it will be seen that outer end walls 152 are provided and inner end walls 153 are provided, the space therebetween being connected by diagonal braces 154 and outer braces 156 at each end of the carrier 140.

Mounted on and supported by the frame formed of the trusses 141 and 161 is a lower floor 180 that is essentially rectangular in shape and is longitudinally confined between the adjacent trucks 220 and is disposed only a short distance above the associated rails 102 and 103 (see FIG. 5). In order to support the floor 180 in its operative position, a first plurality of longitudinally spaced-apart depending hanger posts 181 is arranged along one side of the first truss 141, the posts 181 being more particularly connected to the intermediate lower beam 144 and extending downwardly therefrom and being connected to the floor 180. A second plurality of posts 182 is arranged along the other side on the second truss 161, the posts 182 being more particularly connected to the inner lower beam 163 and extending downwardly therefrom and being connected to the floor 180 It will be appreciated therefore that the upper ends of the posts 181 and 182 are respectively connected to the beams 144 and 163, while the lower ends thereof are connected to the floor 180 to support the floor 180 in the operative position. Also carried by the trusses 141 and 161 is an upper floor 175, the upper floor 175 extending between the beams 143 and 163 and also outwardly to the outer longitudinal edges of the carrier 140 where necessary. For reasons which will be discussed more fully hereinafter, certain sections of the upper floor 175 are raised as at 176 joining an upwardly extending section 177 at the left in FIG. 5. The floor 175 and the floor 180 combine to define a passenger automobile storage space 185 in the lower portion of the carrier 140 and a lounge space 200 in the upper portion of the carrier 140.

Referring to FIGS. 5 and 7, it will be seen that laterally arranged pairs of posts 181 and 182 cooperate to define therebetween spaces for accommodating passenger automobiles 130 and also define therebetween with the assistance of the first and second trusses on the one hand and the lower floor 180 on the other hand, pairs of laterally aligned doorways in the sides of the carrier 140. As illustrated, four spaces are provided to receive four of the passenger automobiles 130 in side-by-side relation with each other and extending laterally of the lower floor 180. Moreover, the confronting aligned doorways at the opposite sides of the storage spaces 185 readily accommodate simultaneous loading and unloading of four passenger automobiles, as explained more fully hereinafter. In each of the storage spaces provided, two pairs of wheel guides 188 and 189 are mounted, the wheel guides 188 and 189 cooperating to provide trackways 183 for the wheels of the passenger automobiles 130. The provision of the trackways 183 insures the parking of the passenger automobiles 130 in the proper positions in the storage space 185, and as illustrated, the passenger automobiles 130 are arranged in the storage positions alternately with relatively narrow and relatively wide laterally extending spaces therebetween and on one side thereof, as the case may be. More specifically, two lower passenger walkways 184 are provided whereby to preserve adequate spacing between each two adjacent passenger automobiles 130 to accommodate complete opening of the doors on one side of each of the passenger automobiles 130. Further, there is arranged adjacent to certain ones of the hanger posts 182 a post 187 supporting thereon a circular stairway 186, two of the stairways being illustrated, i.e., a stairway 186 for each of the passenger walkways 184, the stairway 186 providing communication between the passenger automobile storage space 185 and the passenger lounge space 200 disposed above the upper floor 175. This arrangement insures that the passengers of the passenger automobiles 130 have access to their automobiles 130 and to the passenger lounge space 200 at all times during the transit of the train 110.

As illustrated, four doorways are provided on each side of the automobile carrier 140, laterally opposed doorways being in lateral alignment, all as explained above. The doorways disposed to the right as viewed in FIG. 5 are each closed by a front door 190, the front door 190 being hingedly connected to the outer brace 150 as at 191 and being provided with lock structure 192 at the other end thereof for connection to the adjacent edge of the lower floor 180. The doorways to the left as viewed in FIG. 5 are closed by rear doors 195, the upper edges of each rear door 195 being hingedly connected to the adjacent end of the outer brace 170 as at 196 and the lower end of the rear door 195 carrying lock structure 197 for cooperation with the adjacent edge of the lower floor 180.

It further is pointed out that a dome-shaped roof 160 is provided extending longitudinally of the automobile carrier 140 and mounted upon the upper beams 142 and 162 of the trusses 141 and 161, respectively. There further are provided sidewalls between the adjacent front doors 190 and at each end of the carrier 140, and sidewalls between the adjacent rear doors 195 and the ends of the carrier 140. There further are provided sidewall walls between the outer braces 150 and between the outer braces 170, it being preferred that certain of these sidewalls be transparent so that passengers in the passenger lounge space 200 will be able to view the scenery as the train 110 moves along the associated railway track 101. It further is pointed out by reference to FIG. 5 that the cross section of the carrier 140 is essentially rounded, the roof 160 being dome-shaped, the doors 190 and 195 being outwardly curved and all of the parts being joined at curved junctures so as to provide a streamlined and compact configuration for the automobile carrier 140.

From FIGS. 5 and 7, it will be seen that the automobile storage space 185 has a width that is just sufficient to accommodate a standard American-style automobile 130, the automobile 130 including the usual body 131 supported upon wheels 132 and having at the front end a front bumper 133 and at the rear end thereof a rear bumper 134. It will be seen that the front bumper 133 is disposed closely adjacent to the inner surface of the adjacent front door 190 while the rear bumper 134 is disposed closely adjacent to the inner side of the associated rear door 195, and the top of the body 131 is disposed only a short distance below the lower surface of the upper floor 175. In other words, the automobile storage space 185 is just sufficient to receive the automobile 130 therein and furthermore the carrier 140 is curved so as to provide a rigid inwardly converging sidewall at the trusses 141 and 161.

As has been pointed out above, the stairways 186 are disposed adjacent to the posts 182 and thus opposite the rear wheel 132 of the automobile 130 (see FIG. 5), each of the stairways 186 being disposed at the end of one of the passenger walkways 184. This positioning of the stairway 186 permits both doors of the associated automobiles 130 to be opened so that the passengers in the automobiles 130 have ready access to the adjacent passenger walkway 184. One of the raised sections 176 in the upper floor 175 overlies each of the passenger walkways 184, thereby to provide adequate passenger head room while using the walkway 184 and the upwardly extending section 177 being disposed toward the adjacent stairway 186, again to provide ample head room for a passenger using the passenger walkway 184 and its associated stairway 186.

As is best seen in FIG. 6, the lounge space 200 is divided by the raised sections 176 of the upper floor 175 into a front section 201, a central section 202 and rear section 203, the opposite ends of the lounge space 200 being open to provide communication with adjacent railway cars. In addition to the entrance to the lounge space 200 provided by the stairways 186, a door 205 is provided in one of the sidewalls thereof so that railway passengers not having their automobiles aboard the train 110 may enter directly into the lounge space 200 from an adjacent loading platform, all as will be explained more fully hereinafter. It will be appreciated that a pair of posts provides a doorway that is closed by the door 205, the door 205 being hinged as at 204 to the carrier 140. Immediately inside of the door 205 is an entry 206, the entry 206 being defined by the adjacent end of the railway car, a pair of swinging doors 207 hingedly mounted as at 208, and a wall defining a toilet area 210. Entry into the toilet area 210 is also from the entry 206 via a swinging door 211 hingedly mounted as at 212. Immediately opposite the swinging door 207 is a food dispenser area 209, and alongside one edge of the entry 206 is a wardrobe 218, the wardrobe 218 in fact being a part of the adjacent carrier 140.

At the top of the stairway 186 communicating with the front lounge section 201 is a partition 213 mounting a door 215 on a hinge as at 214, the partition 213 surrounding the upper end of the stairway 186 and having but a single opening therein to receive the door 215. Finally, there is provided in the lounge section 201 a chair 216 between the partition 213 and the toilet area 210, the chair 216 preferably being provided with a table 217 disposed in front thereof, and also a window preferably being provided in the sidewall of the carrier 140 in the vicinity of this chair 216. Another chair 216 is mounted on the adjacent raised section 176 and faces forwardly and to the left as viewed in FIG. 6 and is provided with a cooperating table 217, thus to complete the furnishings of the front lounge.

A central lounge section 202 is also provided with an entryway from the associated stairway 186, a partition 213 being arranged around the upper end of the stairway 186 to enclose the same and being provided with the door 215 therein. Disposed within the central lounge section 202 is a plurality of chairs facing forwardly or to the left and arranged with an aisle therebetween along the center of the carrier 140. Finally, there is arranged in the rear lounge section 203 seven of the chairs 216 and two cooperating tables 217.

Referring to FIGS. 1, 2, 3, and 7, a first system for coupling the cars of the train 110 is disclosed, wherein it will be seen that a two-wheel truck 220 is provided to support the adjacent ends of two of the automobile carriers 140, and more specifically, the adjacent ends of the frames of the automobile carriers 140 as represented by the lower beams 149 thereof. More specifically, the truck 220 comprises a single pair of wheels 221 supported by an axle 222 disposed in a pair of bearing blocks 223, a pair of springs 224 being provided between the bearing blocks and a frame 225 for the truck 220. The rear end of the adjacent automobile carrier 140 carries a rear coupler 240 mounted on the frame thereof and having an opening 241 therein for receiving a coupling pin 245 therethrough. On the front end of each of the automobile carriers 140 is a front coupler 242 including a pair of vertically arranged arms, namely, an upper arm 243 and a lower arm 244, having openings therein that can be placed in alignment with the openings 241, the three aligned openings receiving the coupling pin 245 therethrough, the coupling pin 245 also being connected to the frame 225 of the truck 220. By this connection, the adjacent ends of the automobile carriers 140 are all connected to each other or to the adjacent front car 111 or rear car 250, as the case may be, and also are connected to the truck 220, it being appreciated that the entire weight of the automobile carriers 140 is borne by the trucks 220.

Figure 3:
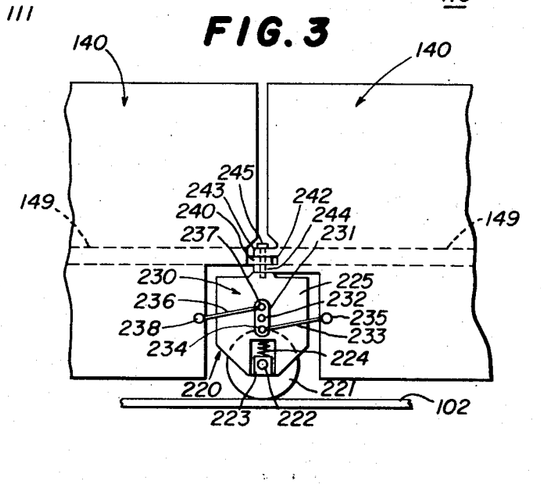
FIG. 3 is an enlarged fragmentary side elevational view illustrating the coupling between two of the cars in the train of FIGS. 1 and 2.

In order to assure correct steering of the truck 220, and specifically the wheels 221 thereof, on curved sections of the railway track 101, a bisecting linkage or steering linkage 230 has been provided interconnecting the truck 220 and the adjacent automobile carriers 140. The purpose of the steering linkage 230 is to ensure that the longitudinal axis of the axle 222 bisects the angle between the longitudinal axes of the adjacent automobile carriers 140. There is preferably provided on each side of the truck 220 one of the steering linkages 230, each steering linkage 230 including a control link 231 pivotally mounted on the truck frame 225 as at 232. A first arm 233 interconnects one end of the control link 231 and the rear automobile carrier 140, one end of the arm 233 being connected as by a pivot 234 to the lower end of the control link 231 and the other end of the arm 233 being connected by the pivot 235 to the rear automobile carrier 140. A second arm 236 interconnects the other end of the control link 231 and the front automobile carrier 140, one end of the arm 236 being connected as by a pivot 237 to the upper end of the control link 231 and the other end of the arm 236 being connected by a pivot 238 to the front automobile carrier 140. The control link 231 in cooperation with the arms 233 and 236 ensure that the longitudinal axis of the axle 222 always bisects the angle between the longitudinal centerlines of the adjacent automobile carriers 140 when the train 110 is on a curved portion of the railway track 101.

The details of construction of the rear car 250 will now be described with special reference to FIGS. 1 and 2 of the drawings. The rear car 250 includes a body 251 which is aerodynamically shaped so as to facilitate control of the train 110 at high speeds on the order of 200 m.p.h. The forward end of the body 251 is mounted on an adjacent truck 220 and the rear end of the body 251 is mounted on a truck 252 supported by two pair of aligned rail wheels 253. As illustrated, the lower portion of the body 251 has a laterally extending passenger automobile storage space 255 therein, automobiles 130 having been illustrated as disposed toward the front of the body 251 with a laterally extending passenger walkway 254 disposed therebetween. There further is provided a general storage space to the rear of the automobile storage space 255, the several storage spaces mentioned being confined between the truck 220 and the truck 252 with the bottom floors thereof disposed only a short distance above the associated railway track 101. There is provided in the upper portion of the body 251 overlying the spaces 254, 255 and 257 space for passengers including a passenger aisle that communicates through an open forward end of the body 251 with the passenger lounge space in the adjacent automobile carrier 140. There further is provided a passenger stairway (not shown) interconnecting the passenger walkway 254 in the lower portion of the body 255 and the passenger walkway in the upper portion of the body 251 so that the passengers in the automobile stored in the space 255 have access to the passenger lounge area in the adjacent automobile carrier 140 via the passenger walkway 254, the above-described passenger stairway connecting to the passenger aisle of the upper portion of the body 251, and through the open forward end of the body 251 into the adjacent passenger lounge space.

Figure 4:
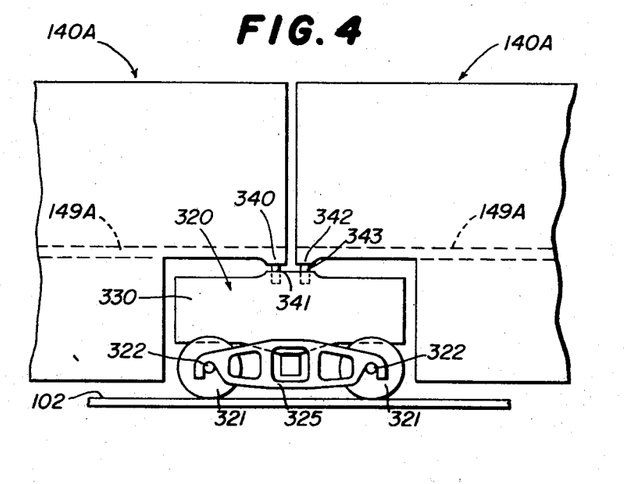
FIG. 4 is a view similar to FIG. 3 and showing an alternative method of coupling two cars in the train of FIGS. 1 and 2.

There is illustrated in FIG. 4 of the drawings an alternative construction for interconnecting adjacent carriers in a railway train such as the railway train 110, there being illustrated two slightly modified automobile carriers 140A connected to a four-wheel truck 320. The four-wheel truck 320 includes a body 330 carrying a pair of side frames 325, the side frames 325 being supported by a pair of axles 322 carrying rail wheels 321 thereon engaging the associated rails, such as the rail 102 illustrated. The adjacent ends of the automobile carriers 140A are slightly modified to accommodate the greater longitudinal extent of the truck 320 as compared to the truck 220 described above, and the frames of the automobile carriers 140A have also been slightly modified as exemplified by the outer beams 149A illustrated. The rear end of the automobile carrier 140A disposed to the left in FIG. 4 carries thereon a rear coupler 340 including a coupling pin 341 that pivotally connects the rear end of the attached automobile carrier 140A to the truck 320. The forward end of the automobile carrier 140A disposed to the right carries a front coupler 342 provided with a coupling pin 343 which pivotally interconnects the adjacent end of the automobile carrier 140A and the truck 320.

The train 110 of the present invention is particularly adapted to be used with standard gauge railway track systems that are provided therealong with toll plazas and loading platforms and unloading platforms, which plazas and platforms are of the general construction disclosed in U.S. Letters Pat. No. 3,285,194 granted Nov. 15, 1966 to Deodat Clejan, the disclosure of which is incorporated herein by reference. As illustrated therein, the railway train serves two or more metropolitan areas, and two toll plazas will be arranged outside of the two respectively adjacent metropolitan areas and respectively connected thereto by highways, the railway track 101 interconnecting the two toll plazas. Each of the toll plazas comprises a pair of platforms respectively disposed on opposite sides of one of the railway tracks 101, the two platforms being disposed in a horizontal plane corresponding to that of the lower floor 180 in the automobile carriers 140 and the lower floors in the front car 111 and the rear car 250. The ends of the platforms are disposed substantially parallel to each other and respectively adjacent to the opposite sides of the bottom floors 180 on the automobile carriers 140 and the bottom floors on the front car 111 and the rear car 250, whereby the passenger automobiles 130 may be selectively loaded and unloaded between the floor 180, for example, and the two platforms merely by driving the passenger automobiles 130 from the platforms onto the floor 180, or from the floor 180 onto the platforms when the doors 190 and 195 carried by the opposite sides of the automobile carrier 140 occupy their open positions.

In a typical constructional example of the automobile carrier 140, the overall length thereof as measured between the rear coupler 240 and the front coupler 242 is 40 feet; the overall width as measured between the outermost surfaces of the doors 190 and 195 is 20 feet, the outermost point on the door 190 being disposed 11 feet from the longitudinal centerline of the associated railway track 101 while the outermost point on the door 195 is disposed 9 feet from the longitudinal centerline of the associated railway track 101, whereby the cross section of the automobile carrier 140 is asymmetrical with the associated railway track 101; and the overall height of the automobile carrier 140 above the heads of the rails 102—103 is 14 feet.

The lower surface of the bottom floor 180 is positioned approximately one foot above the heads of the rail 102—103, while the upper surface of the upper floor 175 is disposed 6 feet 9 inches above the tops of the rails 102—103. The height of the automobile storage space 185 is 5 feet 6 inches, an additional foot of head room in the passenger walkways 184 being provided by the raised floor sections 176. The width of the passenger lounge area 200 as measured between the beams 142 and 162 is 8 feet 3 inches, while the distance from the upper surface of the floor section 176 to the lower surface of the roof 160 at its highest point is 6 feet 5 inches. When empty, the center of gravity of the automobile carrier 140 is disposed 4 feet 4 inches above the tops of the railheads of the rails 102—103, while the center of gravity 260 when the automobile carrier 140 is loaded is disposed 4 feet above the tops of the railheads of the rails 102—103, whereby to provide a very low center of gravity that imparts good stability to the automobile carrier 140, the center of gravity 260 when loaded being disposed directly above the centerline of the associated railway track 101.

It will be appreciated that the cross section of the front car 111 is essentially like that of FIG. 5 and has the dimensions described above with respect to the automobile carrier 140, except that the forward end thereof is streamlined and pointed and rounded, whereby to impart a good aerodynamic shape thereto for high-speed operation. Likewise, the cross section of the rear car 250 is generally like that of FIG. 5 and has the dimensions set forth above with respect to the automobile carrier 140, except that the rear end of the car 250 is diminished in cross section and generally pointed and rounded to impart thereto a good aerodynamic shape particularly useful in high-speed operation.

The described railway train 110 is particularly adapted for operation at high speeds on standard gauge railway tracks and on presently existing railway systems, yet carrying the automobiles 130 therein loaded transversely so as to provide for rapidity of loading and unloading and simplicity of loading and unloading platform design. In cross section, the train 110 including the automobile carriers 140 is relatively small in width and cross-sectional area, whereby to provide for a low weight and a low center of gravity. This configuration is possible because the automobile carrying floors are all disposed only small distances above the associated rails, this construction being made possible by the provision of the trusses 141 and 161 which support all of the weight of the automobile carrier 140 and are disposed at elevated positions and are supported by trucks at such elevated positions. As a result the rigidity of the automobile carrier 140 is provided by the trusses 141 and 161 while the hanger posts 181 and 182 suspend the automobile supporting floor 180 at a desired low position using structure which is strong yet small in size.

The floor area of the passenger lounge space 200 is substantially narrower than that of the automobile storage space, a central aisle or corridor being provided along the passenger lounge space 200 under the apex of the roof 160, whereby to provide the greatest possible headroom. The doors 205 have also been provided so that passengers may reach the passenger lounge area 200 at passenger terminals directly from the exterior of the automobile carrier 140 and without utilizing one of the stairways 186.

Propulsion for the train 110 of the present invention may be effected in any number of ways. The front car 111 may include sufficient motive equipment so as to provide all of the motive power for the attached train, whereby all of the other cars in the train including the automobile carriers 140 may be passive. On the other hand, the front car 111 may also generate electrical power for traction motors mounted on the trucks 220, for example, whereby to drive all, or selected ones of the wheels throughout the train. Finally, propulsion motors may be provided in each of the cars, the propulsion motors being self-contained, whereby each of the cars is self-propelled, the motive power being provided by traction motors wherein power is collected from an overhead wire or a third rail or by a combustion engine such as a diesel engine, a gas turbine and the like. It will be understood that there is ample space for propulsion equipment set forth in each of the cars 111, 140 and 250.

From the above, it will be seen that there have been provided improved railway trains and railway cars and automobile carriers therefor which fulfill all of the objects and advantages set forth above.

While there have been described what are at present considered to be certain preferred embodiments of the invention, it will be understood that various modifications may be made therein and it is intended to cover in the appended claims all such modifications as fall within the true spirit and scope of the invention.

I claim:

1. A railway car for the railway transportation of both passenger automobiles and the passengers thereof; said car comprising an elongated frame supported adjacent to the opposite ends thereof upon running gears and positioned well above the associated railway track, first plurality of longitudinally spaced-apart depending hanger posts arranged along one side of said frame and extending downwardly therefrom, a second plurality of longitudinally spaced-apart depending hanger posts arranged along the other side of said frame and depending downwardly therefrom, a substantially horizontal lower floor carried by the lower ends of said posts and spaced a short distance above the associated railway track and longitudinally confined between said running gears, a plurality of coordinate laterally aligned pairs of confronting doorways provided on the opposite sides of said lower floor, whereby a passenger automobile may be driven onto and off of said lower floor through either of the two laterally aligned confronting doorways and whereby a passenger automobile on said lower floor extends laterally thereof, a plurality of doors respectively associated with said doorways and mounted upon said frame and selectively movable between open and closed positions with respect to said doorways, an upper floor carried by said frame and overlying said lower floor and cooperating therewith to provide an automobile storage space, a roof and sidewalls carried by said frame and cooperating with said upper floor to define an elongated enclosure to provide a passenger lounge space, and a stairway mounted on said frame and providing communication between said automobile storage space and said lounge space.

2. The railway car set forth in claim 1, wherein said lower floor extends laterally outwardly beyond said hanger posts and has a lateral dimension equal substantially to that of the automobiles to be carried thereon.

3. The railway car set forth in claim 1, wherein the dimensions of said lower floor accommodate the simultaneous support thereupon of a substantial number of passenger automobiles extending laterally thereof and disposed in side-by-side relation with each other.

4. The railway car set forth in claim 1, and further comprising wheel guides mounted on said floor and forming trackways for automobiles thereon, the storage positions of said automobiles providing alternately relatively narrow laterally extending spaces therebetween preventing the doors of the adjacent automobile from being opened and relative wide laterally extending spaces therebetween providing passenger walkways and permitting the doors of the adjacent automobiles to be fully opened, one of said stairways being mounted in each of said passenger walkways adjacent to one of said hanger posts and away from the adjacent doors of the associated automobiles, each of said stairways providing communication between the associated passenger walkway in said automobile storage space and said passenger lounge space.

5. The railway car set forth in claim 4, wherein the portions of said upper floor overlying said passenger walkways are deformed upwardly to provide additional headroom for passengers in said passenger walkways.

6. The railway car set forth in claim 1, and further comprising a passenger door in at least one of said sidewalls providing communication between said passenger lounge space and the exterior of said railway car.

7. A railway train for the transportation of passenger automobiles, said railway train comprising a front car and at least one automobile carrier and a rear car connected in tandem relationship; first and second support trucks each extending well above the associated railway track; said front car including an aerodynamically shaped body mounted on rail wheels at the front ends thereof and having a coupler at the rear end thereof pivotally mounted on said first support truck; said automobile carrier including an elongated frame having a first coupler at the forward end thereof pivotally mounted upon said first support truck and having a second coupler at the rear end thereof pivotally mounted upon said second support truck, a first plurality of longitudinally spaced-apart depending hanger posts arranged along one side of said frame and depending downwardly therefrom, a second plurality of longitudinally spaced-apart depending hanger posts arranged along the other side of said frame and depending downwardly therefrom, a substantially horizontal floor carried by the lower ends of said posts and spaced a short distance above the associated railway track and being longitudinally confined between said first and second support trucks, a plurality of coordinated laterally aligned pairs of confronting doorways provided on the opposite sides of said floor whereby a passenger automobile may be driven onto and off of said floor through either of the laterally aligned confronting doorways and whereby an automobile on said floor extends laterally thereof, a plurality of doors respectively associated with said doorways and mounted upon said frame and selectively movable between open and closed positions with respect to said doorways, and a roof and sidewalls carried by said frame and cooperating with said floor and said doors to form an elongated enclosure about said frame, said rear car including an aerodynamically shaped body having a coupler at the forward end thereof pivotally mounted upon said second support truck and said rear car mounted at the rear end thereof upon rail wheels.

8. The railway train set forth in claim 7, wherein the ends of said cars adjacent to said support trucks are pivotally connected to each other and to the adjacent support truck.

9. The railway train set forth in claim 7, wherein each of said support trucks is pivotally connected to the adjacent one of said cars.

10. The railway train set forth in claim 7, wherein each of said support trucks has associated therewith a vertically extending pivot pin receivable in a complementary opening in the upper end of said truck, the couplers on said cars and said automobile carrier each having an opening extending vertically therethrough, the openings in each of the couplers on said automobile carrier being vertically alignable with the opening in the coupler of the adjacent car and with the opening in the adjacent support truck for receiving the associated pivot pin therethrough, whereby each end of said automobile carrier is pivotally coupled to the adjacent car and to the adjacent support truck.

11. The railway train set forth in claim 7, wherein each of said support trucks is of double-axle construction and has a pair of openings centrally disposed in the upper end thereof, the couplers on said cars and said automobile carrier each including a pivot pin depending therefrom and engageable in an adjacent one of the openings in the associated support truck, whereby each of said cars and said automobile carrier is pivotally coupled to the associated support truck.

12. A railway train for the railway transportation of both passenger automobiles and the passengers thereof, said railway train comprising a front car and at least one automobile carrier and a rear car connected in tandem relation; said front car including an aerodynamically shaped body, rail wheels mounting the front of said body on the associated railway track and a first support truck mounting the rear of said body on an associated railway track; said automobile carrier including an elongated frame mounted at the forward end thereof upon said first support truck on an associated railway track, a second support truck mounting the rear end of said frame on an associated railway track, a first plurality of longitudinally spaced-apart depending hanger posts arranged along one side of said frame and extending downwardly therefrom, a second plurality of longitudinally spaced-apart depending hanger posts arranged along the other side of said frame and depending downwardly therefrom, a substantially horizontal lower floor carried by the lower ends of said posts and spaced a short distance above the associated railway track and longitudinally confined between said first and second support trucks, a plurality of coordinate laterally aligned pairs of confronting doorways being provided on the opposite sides of said lower floor, whereby a passenger automobile may be driven onto and off of said lower floor through either of the two laterally aligned confronting doorways and whereby a passenger automobile on said lower floor extends laterally thereof, a plurality of doors respectively associated with said doorways and mounted upon said frame and selectively movable between open and closed positions with respect to said doorways, an upper floor carried by said frame and overlying said floor and cooperating therewith to provide an automobile storage space, a roof and sidewalls carried by said frame and cooperating with said upper floor to define an elongated enclosure to provide a passenger lounge space, the opposite ends of said passenger lounge space being open for communication with the passenger lounge spaces in adjacent cars, and a stairway mounted on said frame and providing communication between said automobile storage space and said passenger lounge space; said rear car including an aerodynamically shaped body mounted at the forward end thereof upon said second support truck, and rail wheels mounting the rear end of said rear car upon an associated railway track.

13. A front railway car for the railway transportation of both passenger automobiles and the passengers thereof; said car comprising an enclosed body, said body including two longitudinally extending truss structures interconnected at spaced-apart points therealong to maintain said truss structures in general parallelism, each of said truss structures being supported adjacent to the opposite ends thereof upon running gears and positioned well above the associated railway track, a lower deck suspended from said truss structures and spaced a short distance above the associated railway track, an upper deck supported by said truss structures and disposed above said lower deck for dividing said body into an automobile storage space in the lower portion thereof and a passenger lounge in the upper portion thereof, coordinate laterally aligned pairs of confronting doorways provided on the opposite sides of said body, whereby a passenger automobile may be driven into and out of said automobile storage space through either one of the two laterally aligned confronting doorways and whereby an automobile in said lower portion extends laterally thereof, a plurality of doors respectively associated with said doorways and mounted upon said body and selectively movable between open and closed positions with respect to said doorways, a stairway interconnecting said automobile storage space in the lower portion and said passenger lounge space in the upper portion, and a source of motive power mounted in said body and connected to at least one of said running gears and propelling said front railway car.

14. A rear railway car for the railway transportation of both passenger automobiles and the passengers thereof; said car comprising an enclosed body, said body including two longitudinally extending truss structures interconnected at spaced-apart points therealong to maintain said truss structures in general parallelism, each of said truss structures being supported adjacent to the opposite ends thereof upon running gears and positioned well above the associated railway track, a lower deck suspended from said truss structures and spaced a short distance above the associated railway track, an upper deck supported by said truss structures and disposed above said lower deck for dividing said body into an automobile storage space in the lower portion thereof and a passenger lounge in the upper portion thereof, coordinate laterally aligned pairs of confronting doorways provided on the opposite sides of said body, whereby a passenger automobile may be driven into and out of said automobile storage space through either one of the two laterally aligned confronting doorways and whereby an automobile in said lower portion extends laterally thereof, a plurality of doors respectively associated with said doorways and mounted upon said body and selectively movable between open and closed positions with respect to said doorways, and a stairway interconnecting said automobile storage space in the lower portion and said passenger lounge space in the upper portion.

15. A railway car for the railway transportation of passengers automobiles said car comprising an elongated frame, said frame including two longitudinally extending truss structures interconnected at spaced-apart points therealong to maintain said truss structures in general parallelism, each of said truss structures being supported adjacent to the opposite ends thereof upon running gears and positioned well above the associated railway track, a first plurality of longitudinally spaced-apart depending hanger posts arranged along one of said truss structures and extending downwardly therefrom, a second plurality of longitudinally spaced-apart depending hanger posts arranged along the other of the truss structures and extending downwardly therefrom, a substantially horizontal floor carried by the lower ends of said posts and spaced a short distance above the associated railway track and having the ends thereof longitudinally confined between said running gears, a plurality of coordinated laterally aligned confronting doorways provided on the opposite sides of said floor, whereby a passenger automobile may be driven onto and off of said floor through either one of the laterally aligned confronting doorways and whereby an automobile on said floor extends laterally thereof, a plurality of doors respectively associated with said doorways and mounted upon said frame and selectively movable between open and closed positions with respect to said doorways, and a roof and sidewalls carried by said frame and cooperating with said floor and said doors to form an elongated enclosure about said frame.

16. The railway car set forth in claim 15, wherein each of said truss structures includes a longitudinally extending upper beam, a longitudinally extending inner lower beam disposed vertically beneath said upper beam substantially parallel thereto, a longitudinally extending outer lower beam disposed outboard of said inner lower beam substantially parallel thereto, a plurality of vertically arranged and longitudinally spaced-apart inner members interconnecting said upper beam and said inner lower beam, a plurality of horizontally arranged and longitudinally spaced-apart bottom members interconnecting said inner lower beam and said outer lower beam, and a plurality of longitudinally spaced-apart outer members interconnecting said upper beam and said outer lower beam, whereby the transverse cross section of each of said truss structures is substantially triangular in outline.

17. The railway car set forth in claim 16, wherein said first hanger posts depend from the inner lower beam of one of said truss structures and said second hanger posts depend from the outer lower beam of the other of said truss structures.

18. The railway car set forth in claim 16, wherein one of said truss structures further comprises an intermediate lower beam disposed between said inner and outer lower beams substantially parallel thereto, and a plurality of intermediate longitudinally spaced-apart members interconnecting said upper beam and said intermediate lower beam, said lower members including a plurality of first lower members interconnecting said inner lower beam and said intermediate lower beam and a plurality of second lower members interconnecting said intermediate lower beam and said outer lower beam.

19. The railway car set forth in claim 15, and further comprising a plurality of automobile trackways on said floor corresponding in number to the number of said pairs of doorways and disposed in lateral alignment therewith.

20. The railway car set forth in claim 15, wherein there are at least three of said doorways on each side thereof.

21. The railway car set forth in claim 15, wherein each of said doors is pivoted adjacent to the upper end thereof and swings outwardly and upwardly away from the associated doorway.

22. The railway car set forth in claim 15, and further comprising passenger walkways respectively disposed between adjacent pairs of automobiles on said floor, whereby the doors of the automobiles adjacent to said passenger walkways may be opened to permit access to and egress from the automobiles.

23. The railway car set forth in claim 15, wherein the dimensions of said floor accommodate the simultaneous support thereupon of a substantial number of passenger automobiles extending laterally thereof and disposed in side-by-side relation with each other.